(12) United States Patent
Zhang et al.

(10) Patent No.: US 10,324,628 B2
(45) Date of Patent: Jun. 18, 2019

(54) SYSTEMS AND METHODS FOR REDUCING DATA FRAGMENTATION

(71) Applicant: Veritas Technologies LLC, Mountain View, CA (US)

(72) Inventors: Shuangmin Zhang, Beijing (CN); Shengzhao Li, Beijing (CN); Xianbo Zhang, Plymouth, MN (US); Kai Li, Beijing (CN); Weibao Wu, Vadnais Heights, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 118 days.

(21) Appl. No.: 15/491,626

(22) Filed: Apr. 19, 2017

(65) Prior Publication Data

US 2018/0307416 A1    Oct. 25, 2018

(51) Int. Cl.
*G06F 13/00* (2006.01)
*G06F 3/06* (2006.01)
*G06F 16/903* (2019.01)
*G06F 16/23* (2019.01)
*G06F 11/14* (2006.01)

(52) U.S. Cl.
CPC ............ *G06F 3/0608* (2013.01); *G06F 3/064* (2013.01); *G06F 3/0683* (2013.01); *G06F 11/14* (2013.01); *G06F 16/23* (2019.01); *G06F 16/90348* (2019.01)

(58) Field of Classification Search
None
See application file for complete search history.

(56) References Cited

U.S. PATENT DOCUMENTS

| 7,305,421 | B2 * | 12/2007 | Cha ..................... G06F 11/1471 |
| 9,274,941 | B1 * | 3/2016 | Throop ................. G06F 12/023 |
| 9,483,469 | B1 | 11/2016 | Chiueh et al. | |
| 2012/0221784 | A1 | 8/2012 | Ban | |
| 2013/0103893 | A1 | 4/2013 | Lee | |
| 2015/0227316 | A1 * | 8/2015 | Warfield ............... G06F 3/0611 711/103 |

* cited by examiner

*Primary Examiner* — Sean D Rossiter
(74) *Attorney, Agent, or Firm* — FisherBroyles, LLP

(57) ABSTRACT

The disclosed computer-implemented method for reducing data fragmentation may include (1) identifying update data which updates an initial data set; (2) categorizing, using a database manager, the update data based on how the update data is expected to impact digital storage device resources; (3) storing the update data in a physical storage device in a physical order based on the category of the update data; and (4) updating, after storing the update data, an extent map indicating a mapping of logical locations of the update data to physical locations at which the update data is stored. Various other methods, systems, and computer-readable media are also disclosed.

20 Claims, 4 Drawing Sheets

SYSTEMS AND METHODS FOR REDUCING DATA FRAGMENTATION

BACKGROUND

When conventional data storage systems store update data subsequent to initially-stored data, they may append the update data to an end of a data container. After several updates of different data for different files, physical storage of data may be very fragmented—a condition in which portions of a data file are stored in a non-sequential manner in a data storage device, such as a hard disk drive.

Retrieving a file stored in a fragmented state may require extra time and resources to piece the fragmented data back together into a compete file. In some cases, delays are due rearranging read/write mechanisms of hard disk drives, such as spinning-platter magnetic hard disk drives, to read file fragments. Thus, seek times for magnetic hard disk drives may increase when files are fragmented. Reassembling fragmented files may also involve using extra computing resources to direct read/write mechanisms of hard disk drives to proper physical locations of the data fragments. Extra computing resources may also be needed to place the data fragments in proper order to reconstruct fragmented files.

The instant disclosure, therefore, identifies and addresses a need for systems and methods for reducing data fragmentation.

SUMMARY

As will be described in greater detail below, the instant disclosure describes various systems and methods for reducing data fragmentation. In one embodiment, a method for performing such a task may include (1) identifying update data which updates an initial data set; (2) categorizing, using a database manager, the update data based on how the update data is expected to impact digital storage device resources; (3) storing the update data in a physical storage device in a physical order based on the category of the update data; and (4) updating, after storing the update data, an extent map indicating a mapping of logical locations of the update data to physical locations at which the update data is stored.

In other examples, the update data may be log data or backup data, and the method may further include storing the update data in an appending format maintaining a sequence order of prior log data or prior backup data. In some examples, the method may include creating a one-to-one mapping of the logical locations of the update data with the corresponding physical storage device locations. In some examples, the update data may be initial ingesting data, incremental merge data, or hot spot data, and the method may include storing the update data in a sequential format maintaining a similar sequence order between the logical locations and the physical locations. In one embodiment, storing the physical data in the physical storage device may replace prior data in the physical storage device locations with the update data. In another embodiment, the update data may be provisioning data, and the method may include storing the update data in a format including replacing prior provisioning data with the update data and storing the update data in a mirror file in a new data container. In some examples, the physical locations may be based on: (1) an anticipated frequency of reading the update data, (2) a likelihood of subsequent deletion of the update data, or both. Additionally or alternatively, in other examples, the physical order may enable sequential access of the update data. In other examples, the method may include enabling access to the update data with the extent map. In some examples, the method may include performing at least one security action in response to identifying the update data as being in a category.

In one example, a system for reducing data fragmentation may include several modules stored in memory, including an identifying module, stored in memory, that identifies update data which updates an initial data set. The system may also include a categorizing module, stored in memory, that categorizes the update data based on how the update data is expected to impact digital storage device resources. The system may also include a storing module, stored in memory, that stores the update data in a physical storage device in a physical order based on the category of the update data. Further, the system may include an updating module, stored in memory, that updates, after storing the update data, an extent map indicating a mapping of logical locations of the update data to physical locations at which the update data is stored. The system may also include at least one physical processor that executes the identifying module, the categorizing module, the storing module, and the updating module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify update data which updates an initial data set; (2) categorize the update data based on how the update data is expected to impact digital storage device resources; (3) store the update data in a physical storage device in a physical order based on the category of the update data; and (4) update, after storing the update data, an extent map indicating a mapping of logical locations of the update data to physical locations at which the update data is stored.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
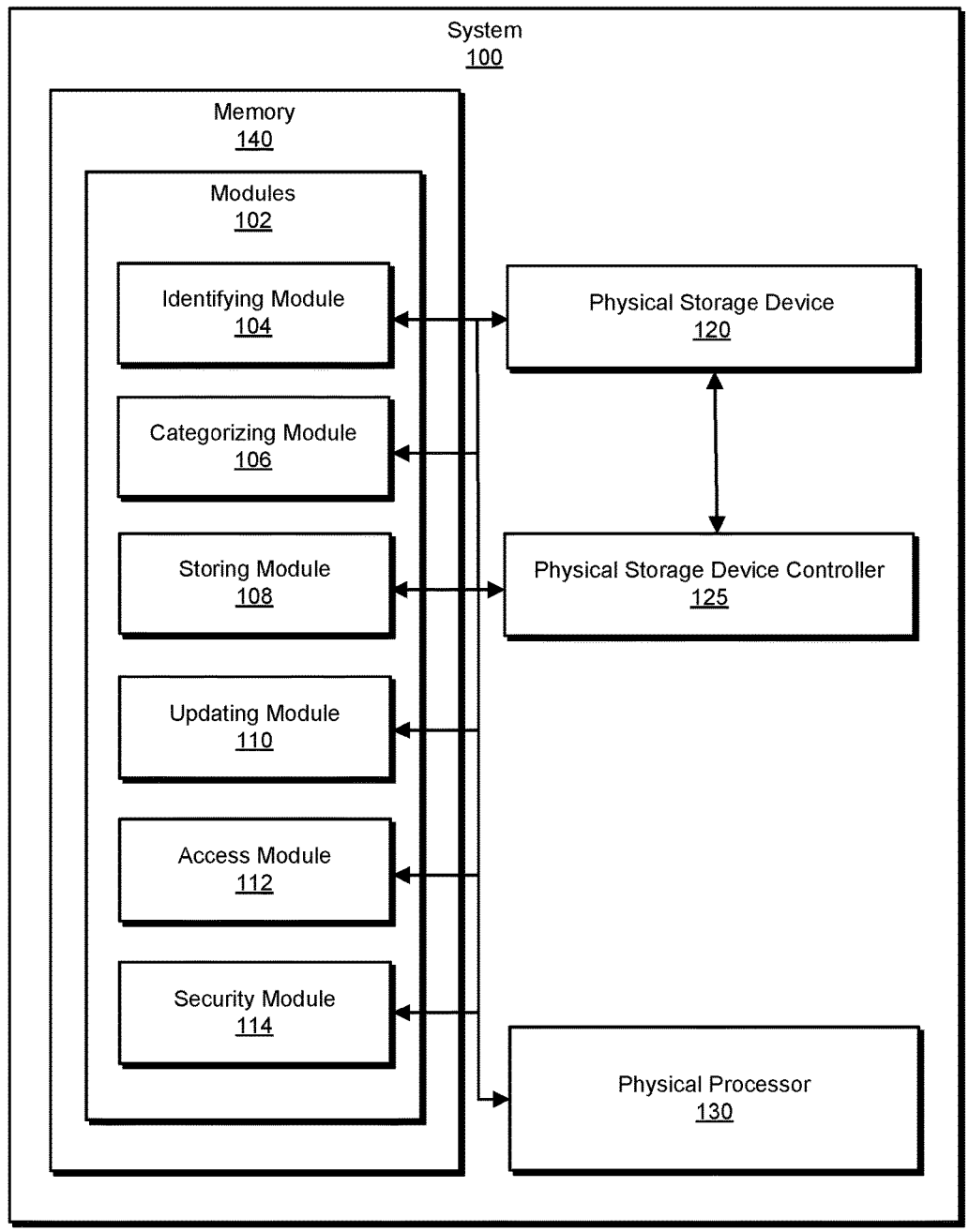
FIG. 1 is a block diagram of an example system for reducing data fragmentation.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for reducing data fragmentation. As will be described in greater detail below, the disclosed systems and methods may categorize update data and store the update data in a physical storage device in a physical order based on the respective category. Categorizing and storing in this manner may align the manner of data storage with subsequent use of the stored data. The alignment may be based on factors such as a frequency of expected subsequent retrievals, expected likelihood of subsequent deletion, an expected quantity of subsequent updates, and/or an expected quantity of subsequent retrievals. Thus, the systems and methods described herein may categorize and store update data based on how the update data is expected to impact physical storage device resources. By doing so, the systems and methods described herein may advantageously improve the availability of physical storage device resources, reduce seek times, and/or reduce wear on read/write mechanisms of hard disk drives. In addition, these systems and methods may save power, time, processing-related expenses, or a combination thereof.

Figure 2:
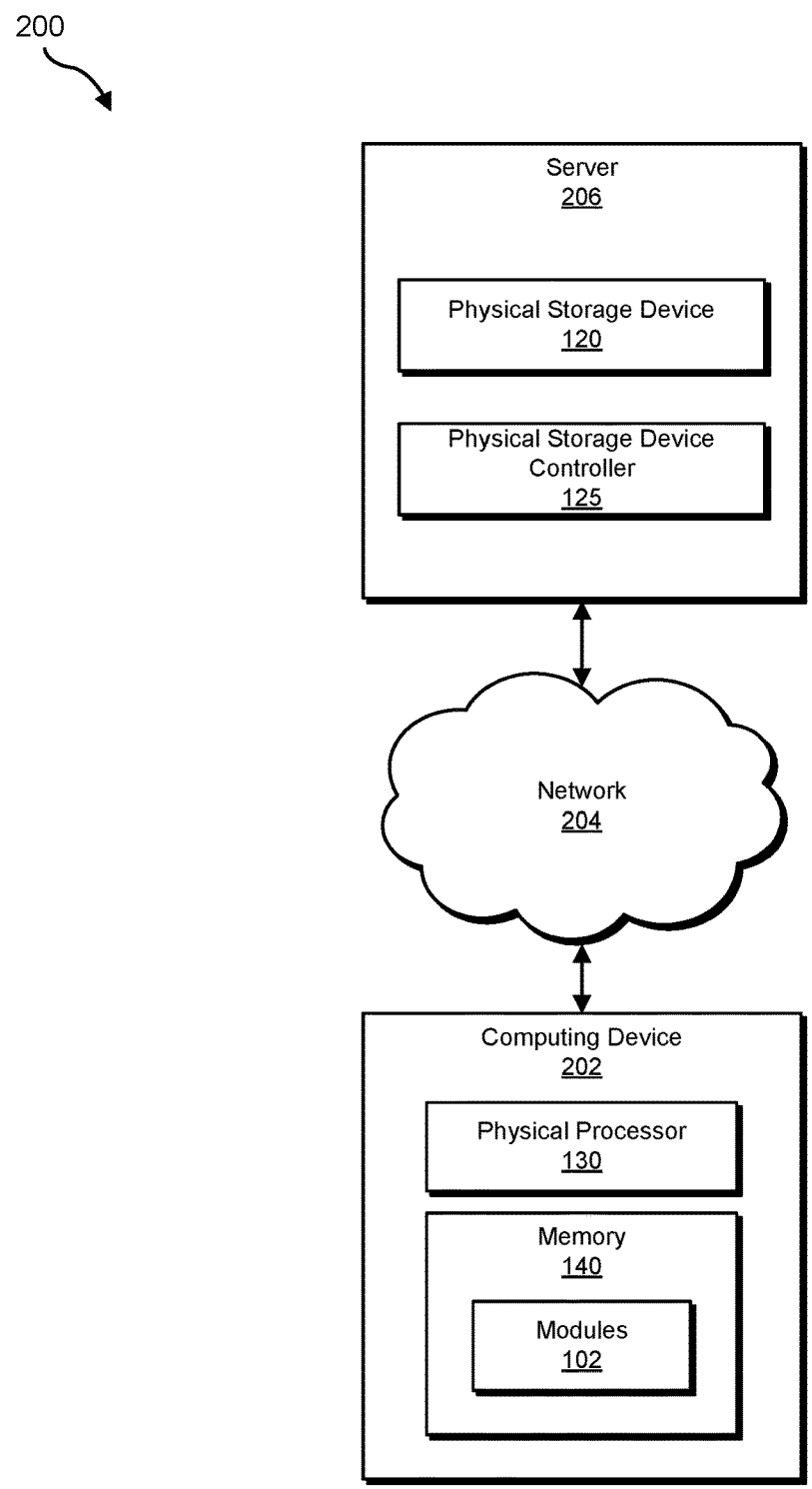
FIG. 2 is a block diagram of an additional example system for reducing data fragmentation.

The following will provide, with reference to FIGS. 1-2, detailed descriptions of example systems for reducing data fragmentation. Detailed descriptions of corresponding computer-implemented methods will also be provided in connection with FIG. 3. In addition, detailed descriptions of storing update data in a physical storage device in physical orders based on categories of the update data will also be provided in connection with FIG. 4.

FIG. 1 is a block diagram of an example system 100 for reducing data fragmentation. As illustrated in this figure, example system 100 may include one or more modules 102 for performing one or more tasks. As will be explained in greater detail below, modules 102 may include an identifying module 104, a categorizing module 106 (e.g., a database manager), a storing module 108, an updating module 110, an access module 112, and a security module 114. Although illustrated as separate elements, one or more of modules 102 in FIG. 1 may represent portions of a single module or application. Example system 100 may generally represent any type or form of computing device capable of reading computer-executable instructions, storing data, managing data storage, managing a database, the like, or a combination thereof. In some examples, example system 100 may represent a system server, a protocol server, a network file system server, or the like. Additional examples of example system 100 include, without limitation, laptops, tablets, desktops, servers, cellular phones, Personal Digital Assistants (PDAs), multimedia players, embedded systems, wearable devices (e.g., smart watches, smart glasses, etc.), smart vehicles, Internet-of-Things devices (e.g., smart appliances, etc.), gaming consoles, variations or combinations of one or more of the same, or any other suitable computing device.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate reducing data fragmentation. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, or any other suitable physical processor.

As illustrated in FIG. 1, example system 100 may also include one or more physical storage devices 120, such as, without limitation, non-transitory rewritable media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), hard disk drives, and the like. In examples, physical storage device controllers 125 generally represents any type or form of physical electronic device which may control an aspect of data storage by physical storage devices 120.

Example system 100 in FIG. 1 may be implemented in a variety of ways. For example, all or a portion of example system 100 may represent portions of example system 200 in FIG. 2. FIG. 2 depicts an example in which data storage by a physical storage device is managed remotely by a remote computing device via a network. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to reduce data fragmentation.

Computing device 202 generally represents any type or form of computing device capable of reading computer-executable instructions, storing data, managing data storage, managing a database, the like, or a combination thereof. In some examples, computing device 202 may represent a system server, a protocol server, a network file system server, or the like. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, Internet-of-Things devices (e.g., smart appliances, etc.), gaming consoles, variations or combinations of one or more of the same, or any other suitable computing device.

Server 206 generally represents any type or form of computing device that is capable of reading computer-executable instructions, storing data, managing data storage, managing a database, the like, or a combination thereof. In some examples, server 206 may represent a system server, a protocol server, a network file system server, or the like. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
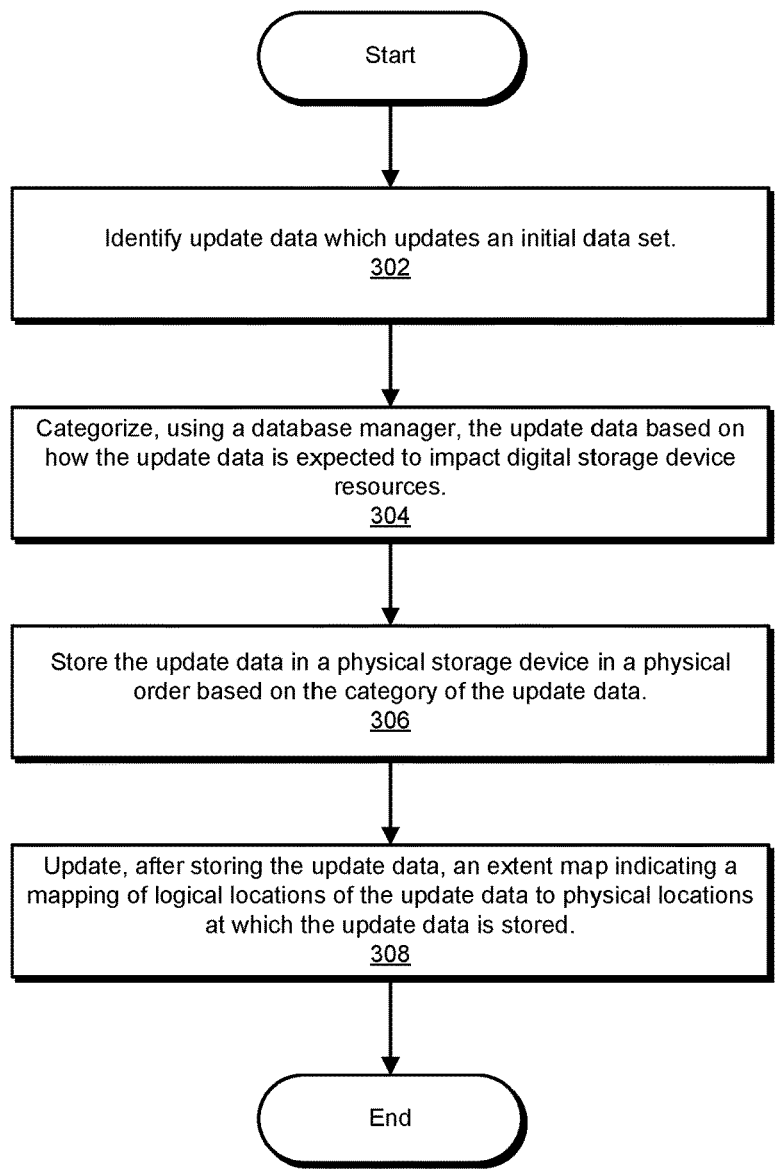
FIG. 3 is a flow diagram of an example method for reducing data fragmentation.

FIG. 3 is a flow diagram of an example computer-implemented method 300 for reducing data fragmentation. The steps shown in FIG. 3 may be performed by any suitable computer-executable code and/or computing system, including system 100 in FIG. 1, system 200 in FIG. 2, the like, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of systems described herein, such as identifying module 104 in system 100 in FIG. 1 or computing device 202 in FIG. 2, may identify update data which updates an initial data set. Systems described herein may perform step 302 in a variety of ways. For example, a processor such as physical processor 130 in FIG. 1 may analyze received data and identify received data as update data. In examples, data may include a flag, header data, the like, or a combination thereof indicating associated data is update data.

The term "initial data set," as used herein, generally refers to any data which has not been subsequently updated. In examples, an initial data set may be stored on a physical storage device, such as physical storage device 120 in FIG. 1.

The term "update data," as used herein, generally refers to any data which updates an initial data set. In examples, update data may update an initial data set previously stored on a physical storage device, such as physical storage device 120 in FIG. 1.

As illustrated in FIG. 3, at step 304, one or more of systems described herein, such as categorizing module 106 in system 100 in FIG. 1 or computing device 202 in FIG. 2, may categorize the update data. For example, categorizing may be based on how the update data is expected to impact digital storage device resources. In examples, some update data is expected to be read infrequently, while other update data is expected to be read frequently. Further, some update data is expected to be updated infrequently, while other update data is expected to be updated frequently. Also, the term "digital storage device resources," as used herein, generally refers to any aspect of physical storage device capacity, availability, power consumption, accessibility, the like, or a combination thereof.

Some non-limiting example categories of update data may include log data, backup data, initial ingesting data, incremental merge data, hot spot data, and provisioning data (such as test data and/or development data). Log or backup data may rarely change after initial writes, and most likely is removed when business operations are complete. Initial ingesting data, incremental merge data, or hot spot data may be data which is expected to be frequently read (such as by multiple applications and/or users), frequently updated, is likely to be retained for a substantial period of time, the like, or a combination thereof. Provisioning data, such as test data and/or development data may be data which is not needed to be shared, not frequently read, not retained when business operations are complete, the like, or a combination thereof.

The systems described herein may perform step 304 in a variety of ways. For example, a processor such as physical processor 130 in FIG. 1 may analyze update data and categorize the update data. In examples, categorizing may be performed by a database manager. Further, update data may include a flag, header data, the like, or a combination thereof indicating an associated category. Additionally or alternatively, a categorizing process may analyze a source of the update data to determine a category of the update data.

As illustrated in FIG. 3, at step 306, one or more of systems described herein, such as storing module 108 in system 100 in FIG. 1 or computing device 202 in FIG. 2, may store the update data in a physical storage device in a physical order based on the category of the update data.

Physical locations may be based on: (1) an anticipated frequency of reading the update data, (2) a likelihood of subsequent deletion of the update data, or both. In examples, physical storage device controller 125 in FIG. 1 may perform step 306, storing update data in physical storage device 120.

Storing module 108 may perform step 306 in a variety of ways. Storing module 108 may store update data based on category include storing log data or backup data in an appending format maintaining a sequence order of prior log data or prior backup data. In examples, storing module 108 may perform a one-to-one mapping of the logical locations of the update data with the corresponding physical storage device locations. Storing module 108 may store Initial ingesting data, incremental merge data, or hot spot data in a sequential format maintaining a similar sequence order between the logical locations and the physical locations. Storing the physical data in the physical storage device may replace prior data in the physical storage device locations with the update data. Storing module 108 may store provisioning data in a format including replacing prior provisioning data with the update data and storing the update data in a mirror file in a new data container.

As illustrated in FIG. 3, at step 308, one or more of systems described herein, such as updating module 110 in system 100 in FIG. 1 or computing device 202 in FIG. 2, may update an extent map indicating a mapping of logical locations of the update data to physical locations at which the update data is stored. The term "extent map," as used herein, generally refers to any relational mapping of data's logical locations to respective physical locations at which the data is stored. During a read process, the extent map enables access to update data.

In examples, the updating may be performed after storing the update data in step 306. The systems described herein may perform step 304 in a variety of ways. For example, the physical processor in FIG. 1 may update an extent map stored in the memory 140 and/or in the physical storage device 120. We turn now to FIG. 4.

Figure 4:
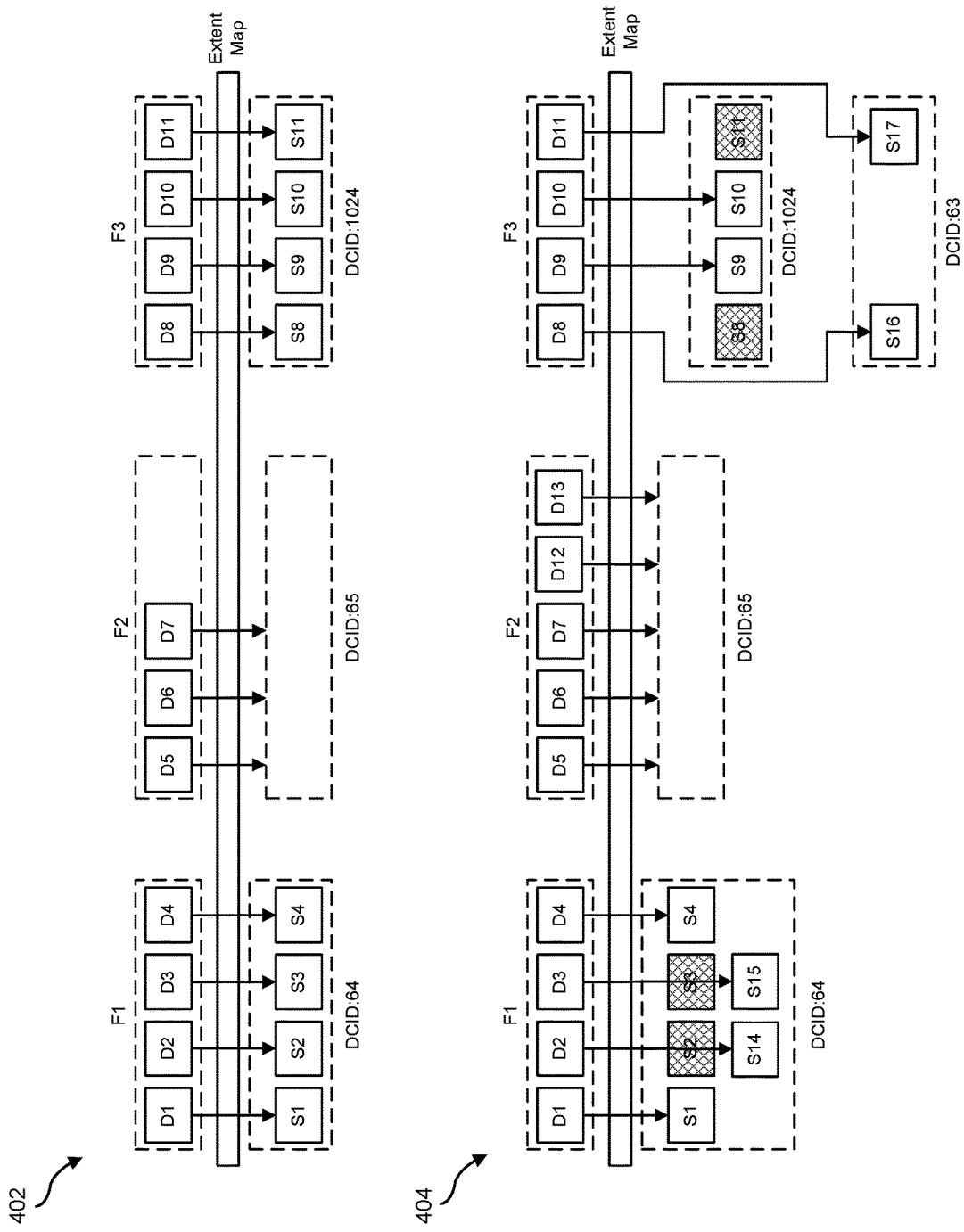
FIG. 4 is an example of storing update data in a physical storage device in physical orders based on categories of the update data.

FIG. 4 depicts examples of different physical orders for storing update data in a physical storage device based on the category of the update data. Referring to FIG. 4, an initial data set may include three stored files designated as F1-F3. File F1 has data from ingestion (D1-D4). File F2 is a log file. File F3 is initially created by ingestion and may be updated after provisioning. An initial extent map may be formatted as: (File number: Extent number {logical location, {container ID, physical location}}. Thus, an initial extent map for files F1-F3 may be:

> F1: Extent 1 {D1, {64, FP_S1}}
> Extent 2 {D2, {64, FP_S2}}
> Extent 3 {D3, {64, FP_S3}}
> Extent 4 {D4, {64, FP_S4}}
> F2: Extent1 {D5, 65}
> Extent2 {D6, 65}
> Extent3 {D7, 65}
> F3: Extent 1 {D8, {1024, FP_S8}
> Extent 2 {D9, {1024, FP_S9}}
> Extent 3 {D10, {1024, FP_S10}}
> Extent 4 {D11, {1024, FP_S11}}

The initial extent map may not include a map for D5-D7, except for recording a respective data container ID. (64, 65, 1024 are examples data container IDs). The initial extent map is also depicted in FIG. 4 as initial extent map 402.

Continuing with the example in FIG. 4, file F1 may be categorized as initial ingestion data. Thus, for logical locations D1-D4, a sequence order of logical locations and physical locations may be at least quite similar or in a perfect sequence. Further, storing the physical data in the physical storage device may replace prior data in the physical storage device locations (S2, S3) with the update data (S13, S14) in the same container (data container id number 64). Accordingly, update data may be stored in a sequential format maintaining a similar sequence order between the logical locations and the physical locations. Further, writing the update data may be fast, as the update data may be appended, and reading data may also be fast because the sequence order between logical and physical may be at least quite similar. Incremental merge data, or hot spot data may also be stored in this manner.

File F2 may be categorized as log file data. Thus, for logical locations D5-D7 and D12-D13, update data in F2 may be appended to data container 65 continuing the initial sequence order. In an example, a one-to-one mapping of the logical locations of the update data may be created with the corresponding physical storage device locations. This physical order may enable sequential access of the update data. Accordingly, read/write performance for the log file may be better than in traditional solutions as the data may be in sequential order. Further, when stored in this physical order, reading the log file may not require searching the extent map or a container record index map. Backup data may also be stored in this manner.

File F3 may be categorized as provisioning data. Thus, for logical locations D8-D11, update data may be stored in data container 63, which may be a special data container working as a shadow container for data container 1024. In other words, update data may be stored in a format including replacing prior provisioning data with the update data and storing the update data in a mirror file in a new data container. The offset in data container may be the same as an offset in a logical file. Thus, there may be garbage data, in prior physical locations, from repeated updates. Also, data locality may be good, as a data access range may be at most double that of a file size.

After storing update data, an updated extent map may be:

> F1: Extent 1 {D1, {64, FP_S1}}
> Extent 2 {D2, {64, FP_S14}}
> Extent 3 {D3, {64, FP_S15}}
> Extent 4 {D4, {64, FP_S4}}
> F2: Extent1 {D5, 65}
> Extent2 {D6, 65}
> Extent3 {D7, 65}
> Extent4 {D12, 65}
> Extent5 {D13, 65}
> F3: Extent 1 {D8, 63}
> Extent 2 {D9, {1024, FP_S9}}
> Extent 3 {D10, {1024, FP_S10}}
> Extent 4 {D11, 63}

The updated extent map may also be depicted in FIG. 4 as updated extent map 404.

As explained above, the disclosed systems and methods may reducing data fragmentation. The disclosed systems and methods may categorize update data and store the update data in a physical storage device in a physical order based on the respective category. Categorizing and storing in this manner may align the manner of data storage based on how the update data is expected to impact physical storage device resources. The systems and methods described herein may reduce seek times, reduce wear on read/write mechanisms of hard disk drives, save power, save time, reduce wasted storage capacity, and/or save processing-related expenses, thereby advantageously improving the improve the availability of physical storage device resources.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for reducing data fragmentation, at least a portion of the method being performed by a computing device comprising at least one processor, the method comprising:
   identifying update data which updates an initial data set;
   categorizing, using a database manager, the update data based on how the update data is expected to impact digital storage device resources, wherein the categories are based on a source of the update data;
   storing the update data in a physical storage device in a physical order based on the category of the update data; and
   updating, after storing the update data, an extent map indicating a mapping of logical locations of the update data to physical locations at which the update data is stored.

2. The computer-implemented method of claim 1, wherein the update data is log data or backup data, and further comprising storing the update data in an appending format maintaining a sequence order of prior log data or prior backup data.

3. The computer-implemented method of claim 2, further comprising creating a one-to-one mapping of the logical locations of the update data with the corresponding physical storage device locations.

4. The computer-implemented method of claim 1, wherein the update data is initial ingesting data, incremental merge data, or hot spot data, and further comprising storing the update data in a sequential format maintaining a similar sequence order between the logical locations and the physical locations.

5. The computer-implemented method of claim 4, wherein storing the physical data in the physical storage device replaces prior data in the physical storage device locations with the update data.

6. The computer-implemented method of claim 1, wherein the update data is provisioning data, and further comprising storing the update data in a format comprising replacing prior provisioning data with the update data and storing the update data in a mirror file in a new data container.

7. The computer-implemented method of claim 1, wherein the physical locations are based on: (1) an anticipated frequency of reading the update data, (2) a likelihood of subsequent deletion of the update data, or both.

8. The computer-implemented method of claim 1, wherein the physical order enables sequential access of the update data.

9. The computer-implemented method of claim 1, further comprising enabling access to the update data with the extent map.

10. The computer-implemented method of claim 1, further comprising performing at least one security action in response to identifying the update data as being in a category.

11. A system for reducing data fragmentation, the system comprising:
   an identifying module, stored in memory, that identifies update data which updates an initial data set;
   a categorizing module, stored in memory, that categorizes the update data based on how the update data is expected to impact digital storage device resources, wherein the categories are based on a source of the update data;
   a storing module, stored in memory, that stores the update data in a physical storage device in a physical order based on the category of the update data;
   an updating module, stored in memory, that updates, after storing the update data, an extent map indicating a mapping of logical locations of the update data to physical locations at which the update data is stored; and
   at least one physical processor that executes the identifying module, the categorizing module, the storing module, and the updating module.

12. The system of claim 11, wherein the physical locations are based on: (1) an anticipated frequency of reading the update data, (2) a likelihood of subsequent deletion of the update data, or both.

13. The system of claim 11, wherein the physical order enables sequential access of the update data.

14. The system of claim 11, further comprising an access module, stored in memory, that enables access to the update data with the extent map.

15. The system of claim 11, further comprising a security module, stored in memory, that performs at least one security action in response to identifying the update data as being in a category.

16. A non-transitory computer-readable medium comprising one or more computer-executable instructions that, when executed by at least one processor of a computing device, cause the computing device to:
   identify update data which updates an initial data set;
   categorize the update data based on how the update data is expected to impact digital storage device resources, wherein the categories are based on a source of the update data;
   store the update data in a physical storage device in a physical order based on the category of the update data; and
   update, after storing the update data, an extent map indicating a mapping of logical locations of the update data to physical locations at which the update data is stored.

17. The non-transitory computer-readable medium of claim 16, wherein the physical locations are based on: (1) an anticipated frequency of reading the update data, (2) a likelihood of subsequent deletion of the update data, or both.

18. The non-transitory computer-readable medium of claim 16, wherein the physical order enables sequential access of the update data.

19. The non-transitory computer-readable medium of claim 16, wherein the computer-executable instructions comprise computer-executable instructions that cause the computing device to enable access to the update data with the extent map.

20. The non-transitory computer-readable medium of claim 16, wherein the computer-executable instructions comprise computer-executable instructions that cause the computing device to perform at least one security action in response to identifying the update data as being in a category.

* * * * *